United States Patent [19]

Saito et al.

[11] Patent Number: 4,895,913

[45] Date of Patent: Jan. 23, 1990

[54] WIRE COATING RESIN COMPOSITION

[75] Inventors: Teruo Saito, Kusatsu; Kuniaki Asai, Tondabayashi; Yasurou Suzuki, Takatsuki, all of Japan

[73] Assignee: Sumitomo Chemical Company, Limited, Osaka, Japan

[21] Appl. No.: 219,822

[22] Filed: Jul. 15, 1988

Related U.S. Application Data

[63] Continuation of Ser. No. 70,506, Jul. 7, 1987, abandoned, which is a continuation-in-part of Ser. No. 878,228, Jun. 25, 1986, abandoned.

[30] Foreign Application Priority Data

Jul. 5, 1985 [JP] Japan ................................ 60-148988

[51] Int. Cl.$^4$ ............................................. C08G 16/00
[52] U.S. Cl. .................................... 525/471; 525/534; 525/535; 525/906
[58] Field of Search ................. 525/471, 534, 535, 906

[56] References Cited

U.S. PATENT DOCUMENTS 4,320,224 3/1982 Rose et al. .
4,624,997 11/1986 Robeson et al. ..................... 525/471

FOREIGN PATENT DOCUMENTS 176988 4/1986 European Pat. Off. ............ 525/471
176989 4/1986 European Pat. Off. ............ 525/471
202256 11/1984 Japan .................................. 525/471

Primary Examiner—John C. Bleutge
Assistant Examiner—David W. Woodward
Attorney, Agent, or Firm—Stevens, Davis, Miller & Mosher

[57] ABSTRACT

A wire coating resin composition comprising 25 to 95% by weight of a polyetherketone and 75 to 5% by weight of an aromatic polysulfone, which is characterized by the intrinsic viscosity (y) of the polyetherketone complying with the condition $$0.83 \leq y \leq 0.01x + 0.65,$$

wherein x represents weight percentage of the polyetherketone in the wire coating resin composition.

4 Claims, 1 Drawing Sheet

WIRE COATING RESIN COMPOSITION

This application is a continuation of application Ser. No. 070,506, filed July 7, 1987, now abandoned, which in turn is a continuation-in-part of application Ser. No. 878,228, filed June 25, 1986, now abandoned.

BACKGROUND OF THE INVENTION

1. Field of the Invention

This invention relates to a wire coating resin composition comprising a polyetherketone and an aromatic polysulfone, which is excellent in mechanical, thermal, and chemical properties.

2. Description of the Prior Art

Polyetherketones are crystalline resins having a high glass transition point and melting point (e.g. 140°–145° C. and 330°–335° C. respectively). They have not only excellent properties such as improved resistances to heat, hydrolysis, solvents, radiation, flame and so on but also an extrusion moldability. Therefore, a good deal of attention has been attracted to the application of the heat resistant insulated wire obtained by extrusion coating of polyetherketone around a conducted material to the parts of the airplanes, ships, automobiles or the like. However, they have such defects that high processing temperature is necessary, the elasticity modulus rapidly lowers at over the glass transition point and the creep is large under high loadings.

It is known from the disclosures of Japanese Patent Application "Kokai" (Laid-Open) Nos. 34,512/83 and 202,256/84 that the above-mentioned defects are improved by blending an aromatic polysulfone to the polyetherketone. For example, the former discloses that the insulated wire obtained by extrusion coating the polyetherketone and the polyethersulfone mixed within the range of the weight ratio from 60/40 to 40/60 is preferable in extrusion molding processability and heat resistance, and if the polyethersulfone content is less than the lower limit, the composition obtained is inferior in extrusion molding processability, or, on the contrary, if the polyethersulfone content exceeds the upper limit, the composition obtained is inferior in heat resistance. The latter discloses a composition comprising 2–98% by weight of polyetherketone and 98–2% by weight of aromatic polysulfone. However, the larger the portion of said aromatic polysulfone in the composition, the lower the resistances to solvents, hot water and so on, which is characteristic properties of said polyetherketone.

The demands to the properties of the wire coating resin composition are getting severer and diverser as to the application to the insulated coated wire having a heat resistance becomes wider. So, it has been eagerly desired for the wire coating resin composition to have the characteristic features of the above composition comprising polyetherketone and aromatic polysulfone and improved resistances to solvents and hot water, etc.

The primary object of this invention is to provide a wire coating resin composition comprising a polyetherketone and an aromatic polysulfone, which is improved in solvent resistance and hot water resistance while having a stable moldability.

SUMMARY OF THE INVENTION

Under the circumstances, the present inventors conducted an extensive study and, as a result, found that the aforementioned difficulties of the said composition can be eliminated by incorporating an aromatic polysulfone having a specific structure with a polyetherketone having a specific structure and an intrinsic viscosity in a specific range which bears a definite relation with the weight percent of the polyetherketone in the composition.

According to this invention, there is provided a wire coating resin composition comprising 25 to 95% by weight of a polyetherketone and 75 to 5% by weight of an aromatic polysulfone, which is characterized by the intrinsic viscosity (y) of the polyetherketone complying with the condition $$0.83 \leq y \leq 0.01x + 0.65 \qquad (1)$$

wherein x represents weight percentage of the polyetherketone in the wire coating resin composition.

BRIEF DESCRIPTION OF THE DRAWINGS

In the accompanying drawings.

DETAILED DESCRIPTION OF THE INVENTION

Figure 1:
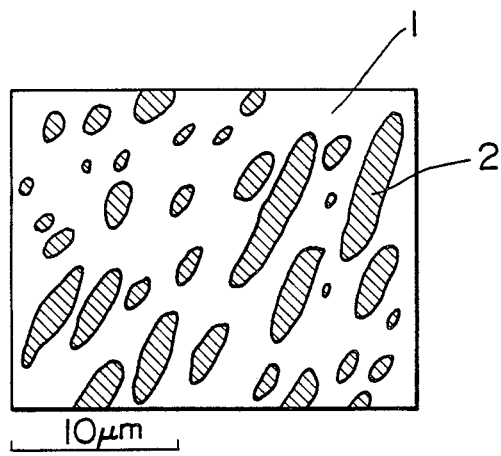
FIGS. 1 and 2 are sectional views of the etched test pieces for tensile test, which were obtained in Example 5 and Comparative Example 1, respectively. In the figures, 1 is the PEEK (polyetheretherketone) phase, 2 is the PES (polyether sulfone) phase which was etched, 3 is the void left behind after the PES phase had been etched away, and 4 is the PEEK phase changed into a fibrous form.

The intrinsic visosity of the polyetherketone, as herein referred to, is a value obtained at 25° C. by using a solution in concentrated sulfuric acid, 1.84 g/cm³ in density, containing 0.1 g of the polymer in 100 cm³ of the solution and calculating by use of the formula $$\text{Intrinsic viscosity} = (t/t_0 - 1)/C \qquad (2)$$

where,
- t: efflux time (second) of the solution of C in concentration,
- $t_0$: efflux time of the solvent,
- C: concentration of the solution (g/100 cm³).

The measurement was performed by using a viscometer in which the efflux time of the solvent was about 2 minutes. The intrinsic viscosity thus obtained is a value unconditionally corresponding to the molecular weight of the polymer.

The polyetherketones having a specific structure used in the present invention are the polymers having the following recurring unit:

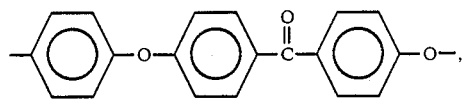

a typical example of which is commercially available under the trade name of VICTREX PEEK from ICI, Ltd.

The polyetherketone used according to this invention should show an intrinsic viscosity, y, complying with this condition $$0.83 \leq y \leq 0.01x + 0.65 \qquad (1)$$

(where x represents a weight percent of polyetherketone in the composition of this invention), preferably the condition $$0.85 \leq y \leq 0.01x + 0.65 \quad (3)$$

most preferably the condition $$0.85 \leq y \leq 0.01 + 0.60 \quad (4)$$

If y is less than 0.83, the composition shows too high a melt fluidity due to the low molecular weight of polyetherketone so that steady molding operation becomes difficult in the most popular injection molding, resulting in a molded product exhibiting shrink-marks (sink-marks) and lacking in dimensional precision owing to insufficient sustaining pressure during the molding. Conversely, if y is large enough to comply with the condition $$y > 0.01x + 0.65 \quad (5)$$

the composition shows a decline in solvent resistance against a good solvent for the aromatic polysulfone and in resistance to hot water.

The aromatic polysulfones used as a component in the present invention are those having the following recurring unit:

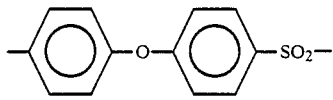

The composition of this invention is further improved in physical properties such as strength and toughness and in resistances against solvents and hot water, when the reduced viscosity of the aromatic polysulfone is 0.3 or above, as determined at 25° C. in a dimethylformamide solution containing 1 g of the polymer in 100 ml of the solution. If the reduced viscosity of aromatic polysulfone is below 0.3, even though the intrinsic viscosity of polyetherketone, y, complies with the condition (1), the composition becomes deteriorated in thermal aging resistance, solvent resistance, and mechanical characteristics.

The blending ratio is 25 to 95% by weight of a polyetherketone and 75 to 5% by weight of an aromatic polysulfone, based on the sum of both components. If the aromatic polysulfone is below 5% by weight and the polyetherketone is above 95% by weight, the modulus of elasticity of the composition becomes markedly decreased at or above the temperature of glass transition of the polyetherketone and, as a consequence, the heat distortion temperature and the creep resistance are not improved, being as low as those of polyetherketone. If the polyetherketone is below 25% by weight and the aromatic polysulfone is above 75% by weight, the composition becomes inferior in solvent and hot water resistances, independent of the molecular weight of polyetherketone. The improvement in the aforementioned properties of the composition is marked when 30 to 90% by weight of a polyetherketone and 70 to 10% by weight of an aromatic polysulfone are compounded.

The means of compounding is not specifically limited. It is possible to feed the aromatic polysulfone and the polyetherketone separately to a melt mixer, or to feed to a melt mixer a preliminary blend prepared by means of a mortar, Henschel mixer, ball mill, or ribbon blender, or to feed directly to an extrusion molding machine or an injection molding machine a dry blend of powdered or pelletized polyetherketone and aromatic polysulfone.

The composition of this invention can be incorporated with one or more common additives such as antioxidants, heat stabilizers, UV absorbers, release agents, colorants, nucleating agents, and the like.

When a polyetherketone, which complies with the condition (1), and an aromatic polysulfone are compounded to form a composition of this invention, there is formed a "islands-in-a-sea" structure, in which the polyetherketone forms the continuous phase and the aromatic polysulfone the dispersed phase. For this reason, even when the composition is immersed in a good solvent which affects the aromatic polysulfone or is exposed to a hot water or steam at a temperature exceeding 180° C., the aromatic polysulfone component is hardly affected by the environment, because it is isolated from the environment by the surrounding continuous phase of polyetherketone having excellent environmental resistance. Even if the polysulfone swells slightly or undergoes slight structural change by the imbibition of a small amount of a good solvent, the composition is not much affected in physical properties such as mechanical properties, because of the predominant characteristics of the polyetherketone which constitutes the continuous phase.

When a polyetherketone having an intrinsic viscosity, y, which complies with the condition (5) is compounded with an aromatic polysulfone, the polyetherketone tends to take a fibrous form and the aromatic polysulfone becomes the continuous phase. When such a composition is dipped in a good solvent for the aromatic polysulfone or is exposed to a hot water or steam at a temperature exceeding 180° C., the aromatic polysulfone which constitutes the continuous phase tends to swell by the absorption of solvent or tends to soften by the absorption of water, resulting in a marked decrease in physical properties.

The invention is illustrated below with reference to Examples, but the invention is not limited thereto. To make clear the features of the composition of the present invention, the compositions in the following Examples were subjected to the injection molding and the properties of the moldings obtained were evaluated.

EXAMPLES 1 TO 7 AND COMPARATIVE EXAMPLES 1 TO 7

A polyetherketone having as fundamental structure a recurring unit

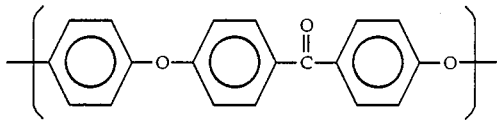

and an intrinsic viscosity of 0.8, 0.85, 0.90, 1.10, or 1.20 and a polyethersulfone having a recurring unit

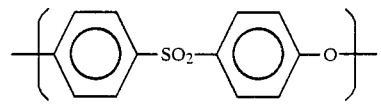

and a reduced viscosity of 0.42 or 0.52, as determined at 25° C. in a dimethylformamide solution containing 1 g of the polymer per 100 ml of the solution, were blended in a ratio as shown in Table 1. The blend was melt-extruded at 360° C. from a twin-screw extruder (PCM-30 of Ikegai Iron Works). After having been cooled in water, the extruded strand was pelletized and injection molded into test pieces for the heat distortion temperature test and for the tensile test by means of an injection molding machine (Sumitomo Nestal 47/28) under the following conditions: cylinder temperature: 380° C.; injection pressure: 1,500 kg/cm$^2$; injection speed: medium; injection time: 10 seconds; cooling time: 20 seconds; and mold temperature: 150° C.

The heat distortion temperature (HDT) test and the tensile test were performed according to ASTM D 648 and D 638, respectively. The stress cracking test was conducted on test pieces for the tensile test by immersing the test piece in ethyl acetate, a poor solvent for polyethersulfone, while being applied with a predetermined stress by means of "Autograph" (Type DSS-2000 of Shimadzu Seisakusho Co.). The solvent resistance was tested on test pieces for the tensile test by immersing in N-methyl-2-pyrrolidone, a good solvent for polyethersulfone, for 24 hours, then determining the weight change, and testing for the tensile strength by means of "Autograph". The hot water resistance was tested on test pieces for the tensile test, by immersing in a hot water at 200° C. in an autoclave for 24 hours, and testing for the tensile strength by means of "Autograph". The injection moldability was evaluated by observing the steadiness of molding the test pieces as described above and inspecting the appearance of injection molded test pieces. The results of test were as shown in Table 1.

As is apparent from Table 1, the composition complying with the herein specified conditions showed an improved modulus of elasticity at high temperatures, that is, a higher heat distortion temperature, as compared with polyetherketone which shows a decrease in modulus of elasticity at high temperatures, that is, a low heat distortion temperature; moreover, the present composition sufficiently retained both the solvent resistance and the hot water resistance characteristic of the polyetherketone, and showed steady injection moldability.

TABLE 1

| | Composition (wt. %) | | | | | | | Initial physical property | | Immersion in N-methyl-2-pyrrolidone for 24 hours | | | Immersion in hot water at 200° C. for 24 hours | | Stress*** cracking resistance | Moldability |
|---|---|---|---|---|---|---|---|---|---|---|---|---|---|---|---|---|
| Solution viscosity | PEEK[1] | | | | | PES[2] | | HDT (18.6 kg/cm²) °C. | Tensile strength kg/cm² | Weight increase wt % | Tensile strength kg/cm² | Retention % | Tensile strength kg/cm² | Retention % | | |
| | 0.80* | 0.85* | 0.90* | 1.10* | 1.20* | 0.52** | 0.42** | | | | | | | | | |
| Example 1 | 80 | | | | | 20 | | 170 | 890 | 0 | 890 | 100 | 910 | 102 | | Good; steady molding; trivial shrink-mark |
| Example 2 | | | 80 | | | 20 | | 170 | 880 | 2 | 860 | 98 | 900 | 102 | | Good; steady molding; trivial shrink-mark |
| Example 3 | | | | | 80 | 20 | | 170 | 880 | 3 | 860 | 98 | 900 | 102 | | Good; steady molding; trivial shrink-mark |
| Example 4 | | 50 | | | | 50 | | 192 | 890 | 2 | 880 | 99 | 880 | 99 | | Good; steady molding; trivial shrink-mark |
| Example 5 | | | 50 | | | 50 | | 190 | 890 | 3 | 870 | 98 | 890 | 100 | | Good; steady molding; trivial shrink-mark |
| Example 6 | | | | 50 | | 50 | | 191 | 860 | 9 | 770 | 90 | 840 | 98 | | Good; steady molding; trivial shrink-mark |
| Comp. Ex. 1 | | | | | 50 | 50 | | 191 | 860 | 21 | 590 | 69 | 700 | 81 | | Good; steady molding; trivial shrink-mark |
| Example 7 | | | 30 | | | 70 | | 205 | 830 | 10 | 720 | 87 | 800 | 96 | | Good; steady molding; trivial shrink-mark |
| Comp. Ex. 2 | | | | 30 | | 70 | | 203 | 820 | 40 | 250 | 30 | 650 | 79 | | Good; steady molding; trivial shrink-mark |
| Comp. Ex. 3 | | | | | 30 | 70 | | 203 | 820 | 50 | 120 | 15 | 630 | 77 | | Good; steady molding; trivial shrink-mark |
| Comp. Ex. 4 | | | 10 | | | 90 | | 203 | 800 | Sol. | — | — | 580 | 73 | | Good; steady molding; trivial shrink-mark |
| Comp. Ex. 5 | 50 | | | | | 50 | | 190 | 860 | 2 | 840 | 97 | 700 | 81 | | Unsteady molding; distinct shrink-mark; prone to flashing |
| Comp. Ex. 6 | | | | | 100 | | | 154 | 900 | 0 | 900 | 100 | 910 | 101 | | Good; steady molding; trivial shrink-mark |
| Comp. Ex. 7 | | | | | | | 100 | 204 | 790 | Sol. | — | — | 650 | 82 | R1 | Good; steady molding; trivial shrink-mark |

Note:
[1]Polyetheretherketone
[2]Polyethersulfone
*Intrinsic viscosity of PEEK in conc. $H_2SO_4$ solution.
**Reduced viscosity of PES in dimethylformamide solution.
*** : No change in the test piece after contact with ethyl acetate for 20 minutes.
R1: Cracking took place after contact with ethyl acetate for 1 minute.

Figure 2:
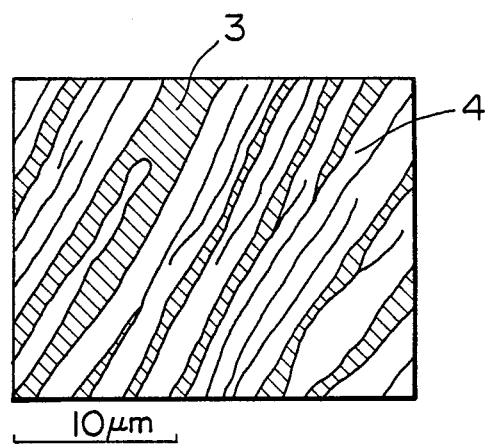

Structural analysis:

Test pieces obtained in Example 5 and Comparative Example 1 were cut, by means of a microtome, through in parallel to the direction of polymer flow in the injection mold in preparing the test pieces. The section was etched with N-methyl-2-pyrrolidone, a solvent for the aromatic polysulfone and observed under a scanning electron microscope. The sectional views were as shown in FIG. 1 (test piece of Example 5) and FIG. 2 (test piece of Comparative Example 1). In the test piece of Example 5, it is seen that polyetherketone, which is not etched, forms the continuous phase surrounding the scattered islands of polyethersulfone, whereas in the test piece of Comparative Example 1, polyetherketone is in fibrous form and surrounded by the continuous phase of polyethersulfone. In spite of the same compounding ratio between polyetherketone and polyethersulfone, the molded test pieces of Example 5 and Comparative Example 1 are morphologically different to a great extent. Therefore, the difference in solvent resistance and hot water resistance between the molded products of Examples 1 to 7 and those of Comparative Examples 1 to 3 seems to be ascribable to the morphological difference.

As described in the foregoing, according to this invention, by compounding 25 to 95% by weight of a polyetherketone, the intrinsic viscosity, y, of which complies with the condition (1), with 75 to 5% by weight of an aromatic polysulfone, it is possible to obtain a composition which is improved in modulus of elasticity at a temperature exceeding the glass transition temperature of the polyetherketone and in creep characteristics under high load, and has a desirable injection moldability, without sacrificing desirable solvent and hot water resistances of the polyetherketone. When the resin composition of the present invention is applied to a heat resistant insulated wire by extrusion coating the resin composition around a conductive material, the wire obtained has a wider application than before.

What is claimed is:

1. A wire coating resin composition comprising 25-95% by weight of a polyetherketone consisting essentially of the following repeating unit:

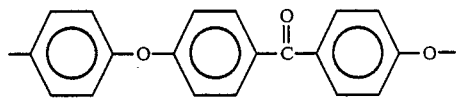

and 75–5% by weight of an aromatic polysulfone consisting essentially of the following repeating unit:

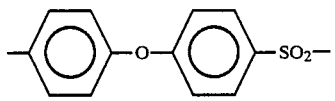

which is characterized by the intrinsic viscosity of the polyetherketone satisfying the following inequality:

$$0.83 \leq y \leq 0.01x + 0.65,$$

wherein x represents the weight percentage of the polyetherketone in the wire coating resin composition and y represents the intrinsic viscosity of the polyetherketone.

2. A wire coating resin composition according to claim 1, which comprises 30 to 95% by weight of the polyetherketone and 75 to 5% by weight of the aromatic polysulfone.

3. A wire coating resin composition according to claim 1, which comprises 30 to 90% by weight of the polyetherketone and 75 to 10% by weight of the aromatic polysulfone.

4. A wire coating resin composition comprising 25–95% by weight of a polyetherketone consisting essentially of the following repeating unit:

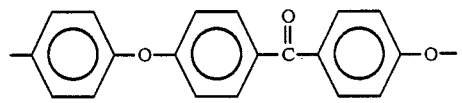

and 75–5% by weight of an aromatic polysulfone consisting essentially of the following repeating unit:

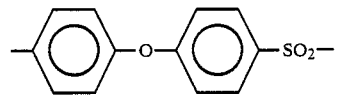

which is characterized by the intrinsic viscosity of the polyetherketone satisfying the following inequality:

$$0.83 \leq y \leq 0.01x + 0.60,$$

wherein x represents the weight percentage of the polyetherketone in the wire coating resin composition and y represents the intrinsic viscosity of the polyetherketone.

* * * * *